United States Patent [19]

Lapeyre

[11] Patent Number: 4,688,933

[45] Date of Patent: Aug. 25, 1987

[54] ELECTRO-OPTICAL POSITION DETERMINING SYSTEM

[75] Inventor: James M. Lapeyre, New Orleans, La.

[73] Assignee: The Laitram Corporation, New Orleans, La.

[21] Appl. No.: 732,864

[22] Filed: May 10, 1985

[51] Int. Cl.⁴ ...................... G01C 3/00; G06K 11/06; G06F 3/03

[52] U.S. Cl. ........................................ 356/1; 356/152; 340/707; 340/710; 178/18; 178/19

[58] Field of Search .................. 356/1, 4, 152; 250/203 R; 178/18, 19; 340/365 P, 707, 710

[56] References Cited

U.S. PATENT DOCUMENTS

| | | | |
|---|---|---|---|
| 2,297,534 | 9/1942 | Brulin | 356/4 |
| 2,350,820 | 6/1944 | Rettinger | 356/1 |
| 2,379,496 | 7/1945 | Sounier, Jr. | 356/4 |
| 2,414,566 | 1/1947 | Thomas | 356/1 X |
| 2,489,220 | 11/1949 | Herbold | 356/4 |
| 2,489,222 | 11/1949 | Herbold | 356/4 |
| 2,660,792 | 12/1953 | Herbold | 356/4 |
| 2,830,487 | 4/1958 | Griffith | 356/152 |
| 3,128,340 | 4/1964 | Harmon | 178/18 |
| 3,152,317 | 10/1964 | Mayer | 356/1 |
| 3,340,763 | 9/1967 | Power | 356/1 |
| 3,400,398 | 9/1968 | Lapeyre et al. | 356/152 |
| 3,437,825 | 4/1969 | Studebaker | 356/1 |
| 3,443,095 | 5/1969 | Früngel | 356/4 |
| 3,553,680 | 1/1971 | Cooreman | 178/18 |
| 3,613,066 | 10/1971 | Cooreman | 178/18 X |
| 3,633,010 | 1/1972 | Svetlichny | 356/4 X |
| 3,654,389 | 4/1972 | Pole | 178/18 |
| 3,680,078 | 7/1972 | Baskin et al. | 178/18 X |
| 3,714,657 | 1/1973 | Lapeyre | 356/152 X |
| 3,723,003 | 3/1973 | Vockenhuber et al. | 356/4 |
| 3,751,154 | 8/1973 | Frazee et al. | 356/4 |
| 3,759,614 | 9/1973 | Harvey | 356/4 |
| 3,761,877 | 9/1973 | Fernald | 178/18 |
| 3,775,560 | 11/1973 | Ebeling et al. | 178/18 |

(List continued on next page)

FOREIGN PATENT DOCUMENTS

| | | | |
|---|---|---|---|
| 2208559 | 8/1973 | Fed. Rep. of Germany | |
| 2093168 | 1/1972 | France | |
| 90335 | 7/1981 | Japan | 340/707 |
| 64581 | 4/1983 | Japan | 340/707 |

OTHER PUBLICATIONS

Interfacing Mice to Computer by Teschler Machine Design, Jan. 12, 1984, pp. 84-91.

Primary Examiner—L. T. Hix
Assistant Examiner—D. Rutledge
Attorney, Agent, or Firm—Weingarten, Schurgin, Gagnebin & Hayes

[57] ABSTRACT

A position determining system for providing electrical signals representative of the positions of a light source movable within a defined area. The system may be implemented for purposes of data entry or for purposes of object location or surveying. When embodied in a data entry tablet, the invention provides signals representative of the positions of a stylus movable within the area of the tablet and comprising first and second photodetectors spaced along a base line by a predetermined distance, and means associated with each photodetector and operative to provide a movable narrow field of view for each photodetector. Means are provided for monitoring the angular position of each of the fields of view with respect to the base line and for providing a signal indication of the respective angular positions. A stylus having a light emitter at the tip thereof is movable within the area of the tablet and provides light detachable by each of the photodetectors. Each of the photodetectors provides a respective signal when the field of view of the corresponding photodetector receives light from the emitter. Means are provided which are operative in response to the signal indication of the angular position of each of the movable means at which light from the emitter is respectively detected to provide a signal representing the position of the emitter within the area of the tablet.

37 Claims, 15 Drawing Figures

U.S. PATENT DOCUMENTS

| | | | |
|---|---|---|---|
| 3,778,157 | 12/1973 | Brelot et al. | 356/4 |
| 3,860,754 | 1/1975 | Johnson et al. | 178/18 |
| 3,917,955 | 11/1975 | Inuiya | 178/19 |
| 3,961,851 | 6/1976 | Gerharz | 356/1 |
| 4,012,588 | 3/1977 | Davis et al. | 178/18 |
| 4,022,969 | 5/1977 | McKinlay et al. | 178/18 |
| 4,177,354 | 12/1979 | Mathews | 178/18 |
| 4,205,305 | 5/1980 | Moore | 340/365 P |
| 4,209,254 | 6/1980 | Reymond et al. | 356/152 |
| 4,294,543 | 10/1981 | Apple et al. | 178/18 |
| 4,313,109 | 1/1982 | Funk et al. | 340/365 P |
| 4,364,035 | 12/1982 | Kirsch | 340/710 |
| 4,390,873 | 6/1983 | Kirsch | 340/710 |
| 4,409,479 | 10/1983 | Sprague et al. | 340/710 X |
| 4,419,011 | 12/1983 | Matsuda et al. | 356/1 |
| 4,441,809 | 4/1984 | Dudley et al. | 356/1 |
| 4,465,366 | 9/1984 | Schmidt | 356/1 |
| 4,470,122 | 4/1984 | Sarr | 364/559 |
| 4,520,360 | 5/1985 | Schwab | 356/4 X |
| 4,550,250 | 10/1985 | Mueller et al. | 250/203 R |
| 4,568,182 | 2/1986 | Modjallal | 356/1 | ic signals representative of the position of an object
ELECTRO-OPTICAL POSITION DETERMINING SYSTEM

FIELD OF THE INVENTION

This invention relates to position determining systems and more particulary to apparatus for providing electrical signals representative of the position of an object movable within a predetermined area.

BACKGROUND OF THE INVENTION

Systems are knwon for determining the position or location of an object within a defined area. Such systems find utility for the entry of graphic and other information into a computer, and are often embodied into a data entry tablet which includes means for sensing the position of a stylus or other point movable within a defined area, and for providing an electrical signal which is representative of successive stylus positions, thereby to denote lines, curves and figures drawn by the stylus on the tablet. Another known use for position determining systems is for land surveying and wherein means are provided for sensing the position of a target movable within a defined area, and for providing a signal representative of the sensed target positions and from which survey information can be derived.

A related data entry device is known as a cursor controller or "mouse", which is usually in the form of a small housing movable over a surface and which provides corresponding movement of a cursor on a display screen. Movement of the cursor can be employed for data entry of graphical information and can also be used as a pointer for identifying a position on the screen or information displayed on the screen, such as for interactive computer usage. In general, mouse movement is provided by a ball that rolls over a surface, the ball movement being sensed by mechanical or optical means. Motion can also be sensed via a specially prepared sensible surface over which the mouse is moved. For example, a checkerboard pattern has been employed on a surface, and light reflected from the surface is detected by a photodetector which provides pulse signals indicative of motion with respect to the surface pattern. A review of several different types of mouse cursor controllers is provided in an article entitled "Interfacing Mice to Computers", *Machine Design*, Jan. 12, 1984, pp. 84–91.

Graphic input devices are known using pairs of scanned light beams, as shown, for example, in U.S. Pat. Nos. 3,553,680; 3,613,066; 3,364,389; and 4,294,543. In this type of entry device, first and second narrow light beams are scanned across a surface and means are provided for sensing the light beams at intersecting points within a surface, the angular position of the two beams at the detected intersections representing the position within the defined area. Another known technique employs orthogonal light beams provided across a display surface, the interruption of selected orthogonal pairs of beams providing an identification of the data entry point.

Examples of surveying and related systems for automatic position determination are shown in U.S. Pat. Nos. 3,714,657; 3,400,398; 3,437,825; and 3,443,095. Range measuring systems are shown for example in U.S. Pat. Nos. 2,830,487; 3,759,614; and 3,961,851.

SUMMARY OF THE INVENTION

The present invention provides a position determining system for providing electrical signals representative of the positions of a light source movable within a defined area. The system may be implemented for purposes of data entry or for purposes of object location or surveying. When embodied in a data entry tablet, the invention provides signals representative of the positions of a stylus movable within the area of the tablet and comprising first and second photodetectors spaced along a base line by a predetermined distance, and means associated with each photodetector and operative to provide a movable narrow field of view for each photodetector. Means are provided for monitoring the angular position of each of the fields of view with respect to the base line and for providing a signal indication of the respective angular positions. A stylus having a light emitter at the tip thereof is movable within the area of the tablet and provides light detectable by each of the photodetectors. Each of the photodetectors provides a respective signal when the field of view of the corresponding photodetector receives light from the emitter. Means are provided which is operative in response to the signal indication of the angular position of each of the movable means at which light from the emitter is respectively detected to provide a signal representing the position of the emitter within the area of the tablet.

In one presently preferred embodiment, a rotating cylinder is provided for each photodetector, the cylinder having a slit providing a narrow field of view or line of sight which is rotatable at a constant and known angular velocity. The time of rotation of each of the cylinders is monitored with respect to a start or reference position such that the time elapsed between the start position and the time at which light from the emitter is detected by each of the photodetectors is known. The elapsed time is a measure of the angular position of the rotating cylinder with respect to the detected position of the emitter and from this angular information, the position of the emitter with respect to the detectors is readily determined by known geometrical relations. Alternatively, the angular position of each of the roatating cylinders can be determined by use of respective shaft angle encoders which provide signal indications of the rotational position of the respective cylinders and therefore the respective fields of view. In this latter instance, angular position is measured directly, and the rotational velocity of the fields of view need not be constant or known.

The rotatable field of view can be provided by other means such as an opaque shield rotatably movable around each detector and operative to occlude light from the light source when in the line of sight between the source and the detector. A timing cycle can be commenced by the sensed change in received light upon passage of the leading or trailing edge of the shield. The moving field of view can also be provided by a linearly movable slit or other view limiting shield.

In another embodiment, a single photodetector is employed and is rotatable about an axis and operative to detect light from a soruce movable within a defined area at each of two predetermined positions in the path of rotation. The position of the light source in relation to the detector positions is then determined.

In an alternative embodiment, a pair of light emitters is provided along a straight edge which is movable within the tablet area and the position of each of the emitters is determined in the manner described above to provide an indication of the position of the straight edge within the tablet area. Additional commands can be provided in conjunction with the position data of the emitter or emitters to provide data corresponding with the position of the stylus or straight edge at intended portions of the tablet area.

DESCRIPTION OF THE DRAWINGS

The invention will be more fully understood from the following detailed description taken in conjunction with the accompanying drawings in which.

DETAILED DESCRIPTION OF THE INVENTION

Figure 1:
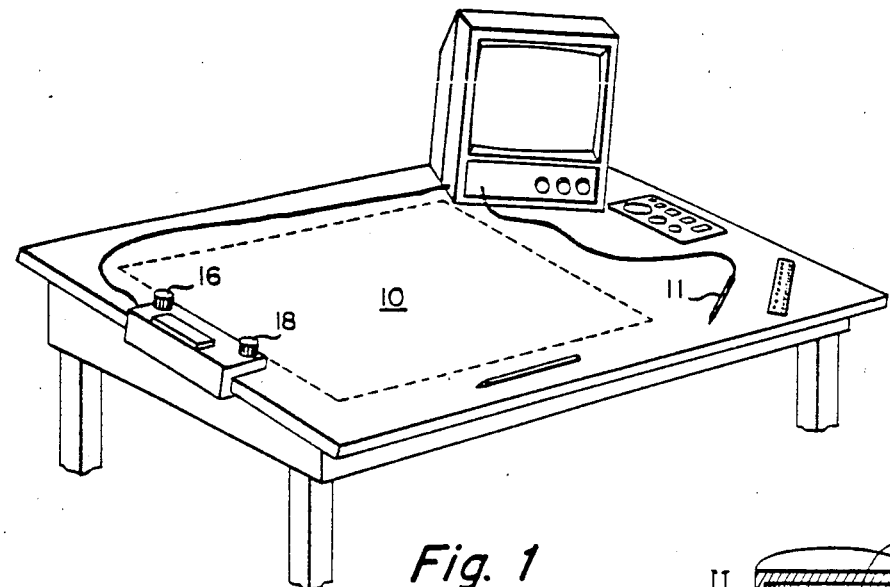
FIG. 1 is a pictorial representation of a preferred embodiment of the invention.
Figure 2:
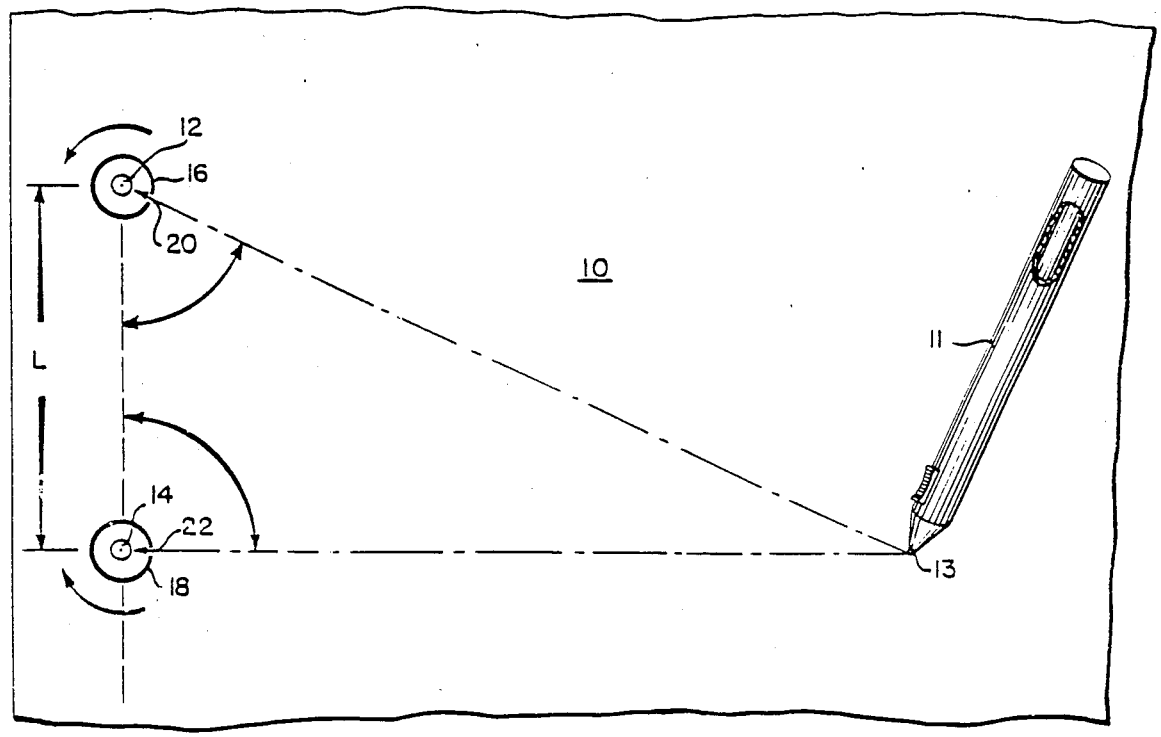
FIG. 2 is a diagrammatic representation of a prefered embodiment of the invention.

Referring to FIGS. 1 and 2, there is shown a data tablet having a defined area 10 within which a stylus 11 is movable. The stylus has a light emitter 13 such as a light emitter diode (LED) on the tip thereof. It should be understood, however, that the light provided by emitter 13 is not limited to light having a frequency in the visible range, and, in fact may preferably have a frequency in the infrared frequency range. First and second photodetectors 12 and 14 are provided along an edge of the tablet, the detectors being spaced apart by a predetermined distance L which defines a known base line. A pair of opaque cylinders 16 and 18 are provided around respective photodetectors 12 and 14, each of the cylinders having a respective slit 20 and 22, axially provided thereon to provide a narrow field of view or line of sight for light receivable by the respective photo-detectors from the emitter 13. Each of the cylinders is rotatable by suitable motive means such as respective electric motors.

Figure 3:
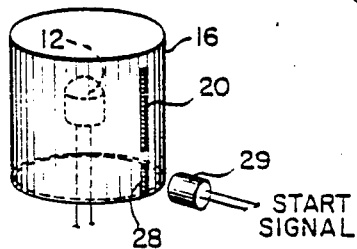
FIG. 3 is a diagrammatic representation of one means for sensing cylinder rotation.
Figure 5:
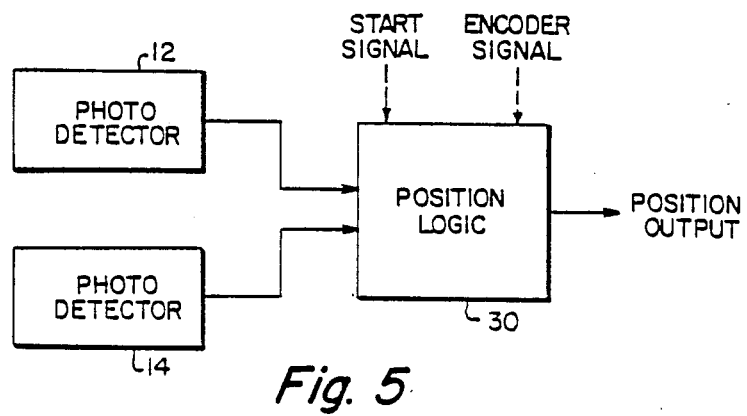
FIG. 5 is a block diagram of the processing logic.

The angular position of each of the rotating cylinders is determined, in one embodiment, by measurement of the elapsed time of rotation of each of the cylinders with respect to a start or zero reference position. As illustrated in FIG. 3, a start position for each of the cylinders is defined by a fiducial mark 28 on the cylinder and which is sensed by sensor 29 to produce a signal which causes a clock counter in processing logic 30 (FIG. 5) to be started to provide a count representative of the angular position of the associated rotating cylinder with respect to the start position. The processing logic 30 also receives the outputs from photodetectors 12 and 14. The time elapsed between the start position and the time at which light from the emitter is detected by each of the photodetectors is determined by logic 30 by use of known geometrical relationships. The elapsed time is a measure of the angular position of the rotating cylinders with respect to the detected position of the emitter and, from this angular information, the position of the emitter with respect to the detectors is readily determined. The logic 30 provides an output signal representative of the position of the emitter within the tablet area, and this signal can be provided to a display or other utilization apparatus.

Figure 4:
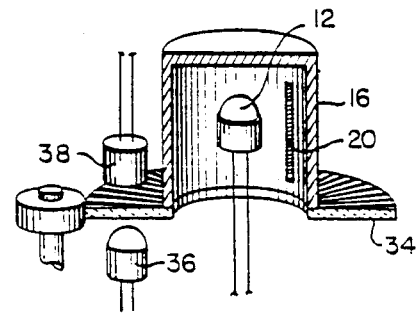
FIG. 4 is a diagrammatic representation of another means for sensing cylinder rotation.

An alternative embodiment is illustrated in FIG. 4 in which the angular position of each of the rotating cylinders is directly provided. Referring to FIG. 4, a shaft angle encoder is coupled to the cylinder 16, the encoder being operative to provide a signal representative of the rotational position of the associated cylinder. The encoder comprises an encoder disc 34 attached to and rotatable with the cylinder, and a light sensor 36 operative to receive light from source 38 which is directed through the disc 34. The sensor 36 provides signals which represent the rotation of the disc and cylinder 16. The encoder signals are employed by logic 30 in association with the photodetector signals to calculate the position of the emitter in relation to the detectors.

Figure 6:
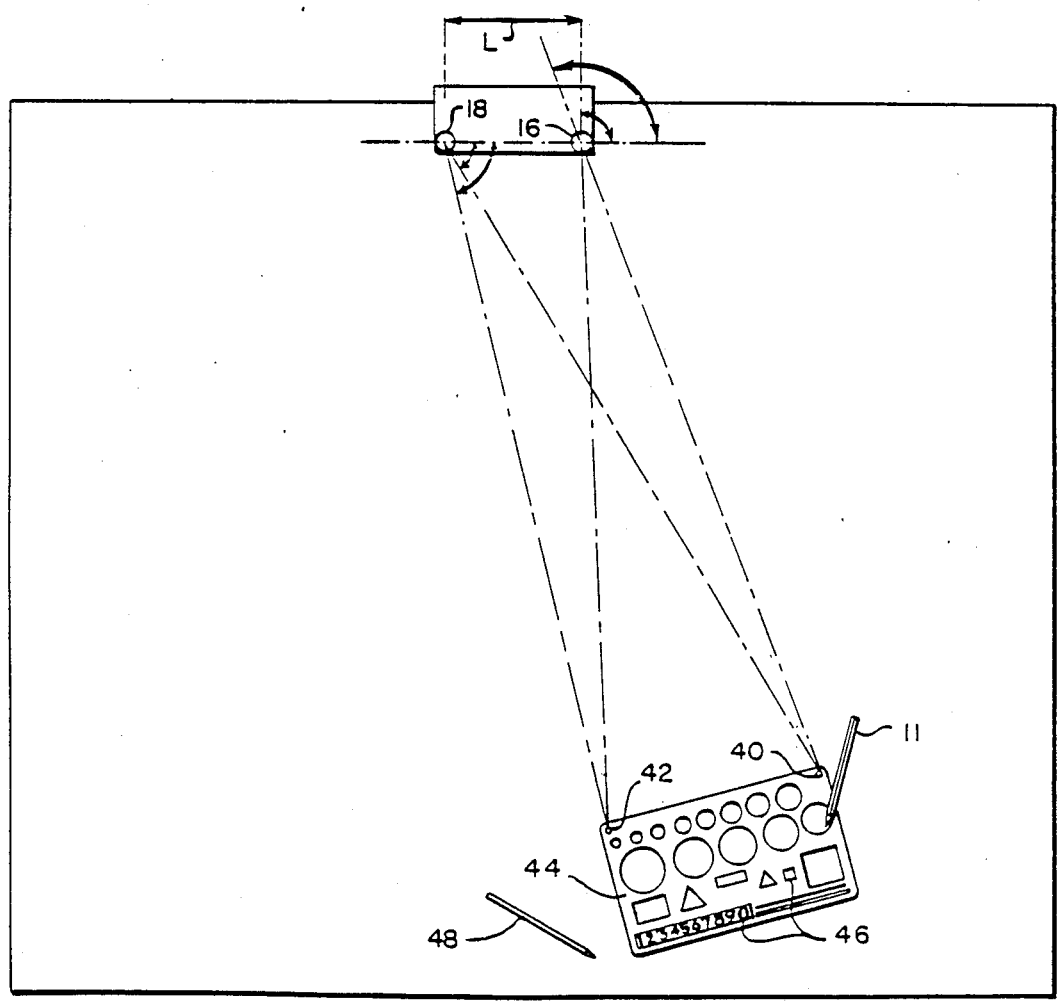
FIG. 6 is a diagrammatic representation of an alternative embodiment.

A further embodiment is illustrated in FIG. 6 in which a pair of light emitters 40 and 42 is provided in spaced relation along a straight edge which is movable within the tablet area. In the illustrated embodiment, the light emitters 40 and 42 are provided on a template 44 which is movable within the tablet area. The position of each of the emitters is determined in the manner described above to provide an indication of the straight edge defined by the spaced emitters within the area of the tablet. The template can include a standard frame into which various template sheets are insertable, each providing symbols and forms as desired.

It may be desirable to distinguish between the respective emitters 40 and 42. This can be accomplished in several different ways, including the employment of different frequencies of light emission by the respective emitters, or by pulsing the emitters at different rates. If such coding of the light emissions is employed, the circuitry associated with the light sensors will include means for distinguishing between the respective light emissions.

In addition to the entry of the position of a stylus point or an edge and the display of such point of edge positions, additional information can be entered for display in association with the positional data or for other associated use. For example, characters such as numbers, letters and symbols 46 can be provided on the template 44 of FIG. 6 and such items can be displayed in association with the position and orientation of the defined edge by entry of such items. Such data entry can be, for example, by means of an optical pen 48 for selecting characters. Once the orientation of the defined edge or orientation of the template is known, in the manner described above, the position of each symbol, number or letter within the template is also known and can be readily entered into a data system for display such as by optical pen or other known means.

Figure 7:
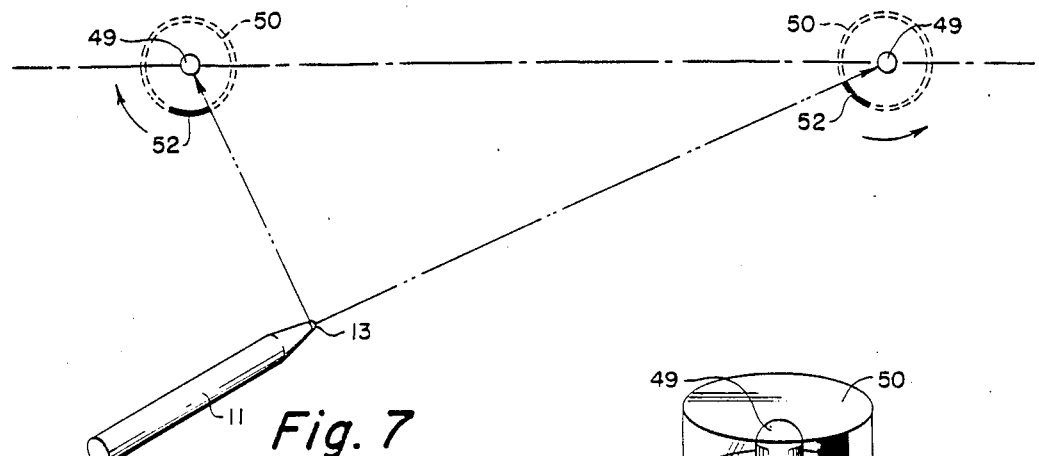
FIG. 7 is a diagrammatic representation of an alternative embodiment of the invention.
Figure 8:
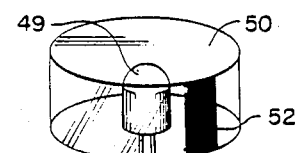
FIG. 8 is a pictorial representation of a detector and view limiting shield means employed in the embodiment of FIG. 7.

In the above embodiments, each detector has a rotating slit associated therewith for defining the respective narrow field of view. A further embodiment is shown in FIG. 7, which depicts a pair of detectors 49 each having a transparent cylinder 50 disposed therearound with an opaque segment 52 on the cylinder. Each of the detectors can be similarly embodied as illustrated in FIG. 8. The detectors receive light from the light source 13 at all times except when temporarily occluded by the interposition of the opaque shield in the light path. The line of sight between the light source and detector can be specified at the leading edge or trailing edge of the moving shield. The arcuate length of the shield can be of any extent less than 360°. During the interval at which the shield occludes the light, the clock counters can be reset for the next timing cycle. In operation, a start signal can be provided as the leading edge of the shield enters the light path, causing a change in the sensed light, and a timing interval commenced for that rotational cycle of the cylinder. Alternatively, the passage of the trailing edge of the shield out of the light path can signify the commencement of a timing cycle.

Figure 9:
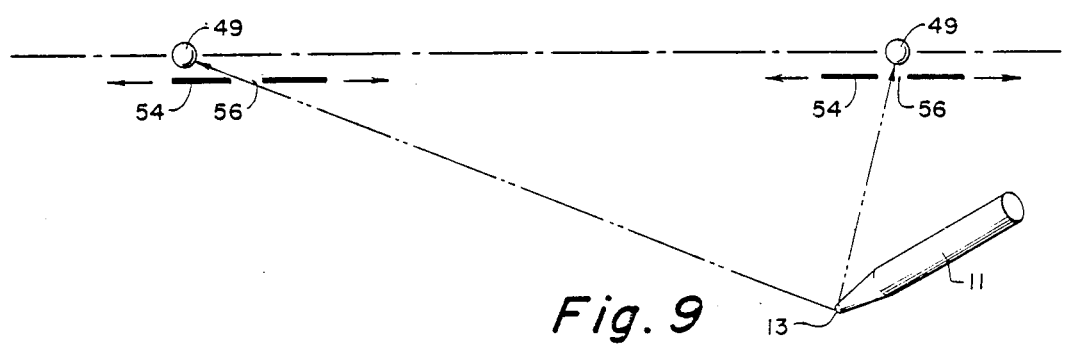
FIG. 9 is a diagrammatic representation of a further embodiment employing a view limiting shield which is linearly movable.

The moving field of view can be otherwise coordinated with the detector and need not be by a rotating field of view, as described above. In the embodiment of FIG. 9, an opaque shield 54 is provided having a slit 56 therein. The shield being linearly movable in reciprocating fashion past the associated detector. Each detector includes a similar reciprocating shield. The line of sight between each detector and the light source is determined by the alighnment of the respective slits with the respective light paths.

Figure 10:
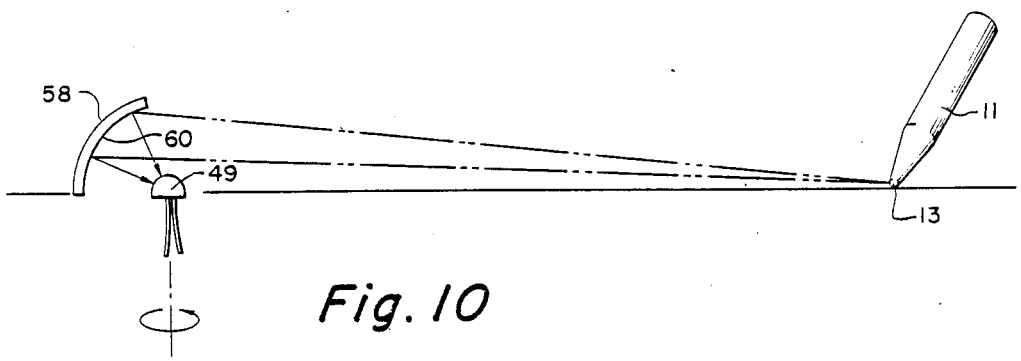
FIG. 10 is a diagrammatic representation of a rotatable mirror employed for directing received light to an associated detector.
Figure 11:
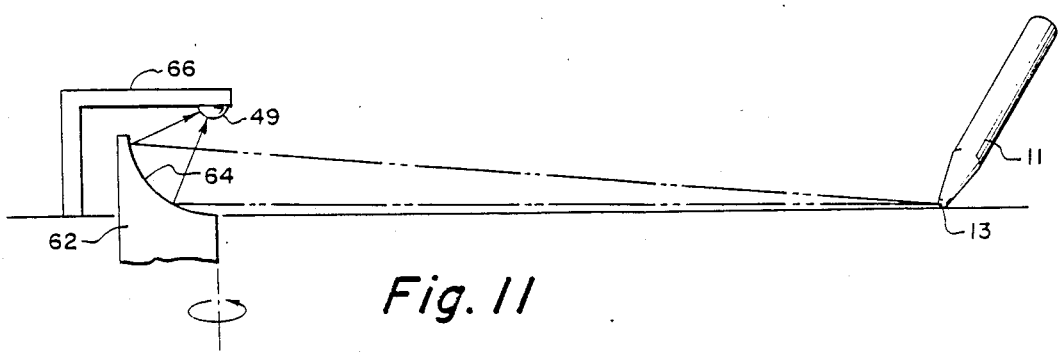
FIG. 11 is a diagrammatic representation of an alternative rotating mirror arrangement for directing received light to an associated photodetector.

In the embodiment of FIG. 10, a rotating mirror 58 is employed to direct light from the light source 13 to the photodetector 49. Upon alignment of the reflecting surface 60 of the rotating mirror with the incident light, light is directed to the detector to specify the line of sight for the position determining computation. Another mirror implementation is shown in FIG. 11, in which the mirror 62 is rotatable about the axis, and upon alignment of the reflecting surface 64 which the incident light, light is reflected to the detector 49, which in this implementation is top mounted such as on a support arm 66.

Figure 12:
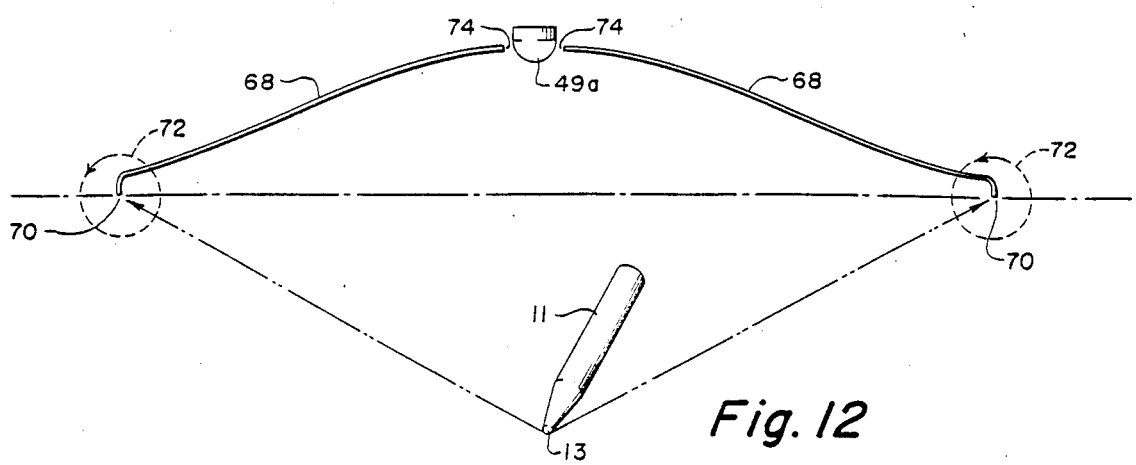
FIG. 12 is a diagrammatic representation of an embodiment of the invention employing fiber optic cables for directing light from two sensed positions to a single photodetector.

A further embodiment is illustrated in FIG. 12 in which a single photodetector 49a is employed. A pair of fiber optic cables 68 are provided, each coupling light from a respective sensing position to the single detector. The outer end 70 of each fiber optic cable 68 is disposed to receive light from the light source 13 as selectively provided by the moving field of view, such as a rotating cylinder 72 having a slit thereon, as in the embodiment of FIG. 3 described above. Other means can be provided for transmitting or reflecting light received from the respective light sensing positions to the single photodetector, such as a mirror or mirror assembly. The inner end 74 of each fiber optic cable is in light coupling relation to detector 49a.

Figure 13:
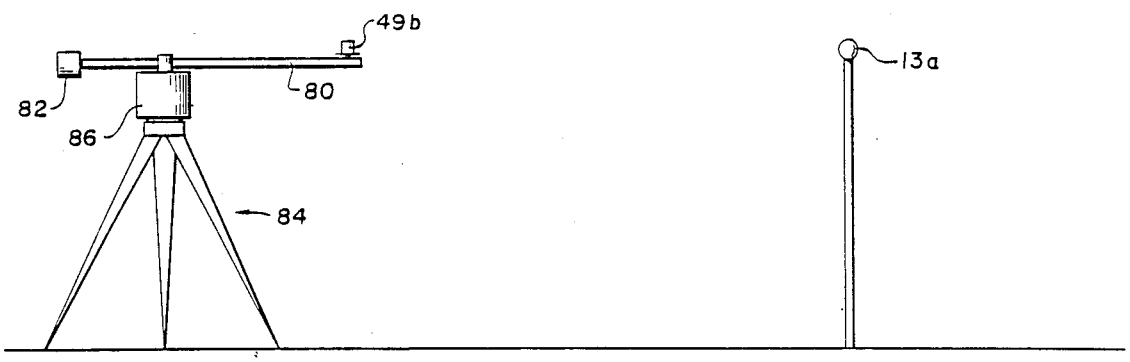
FIG. 13 and FIG. 14 are elevation and top views, respectively, of another embodiment utilizing a rotatable single detector and useful especially for land surveying purposes.
Figure 14:
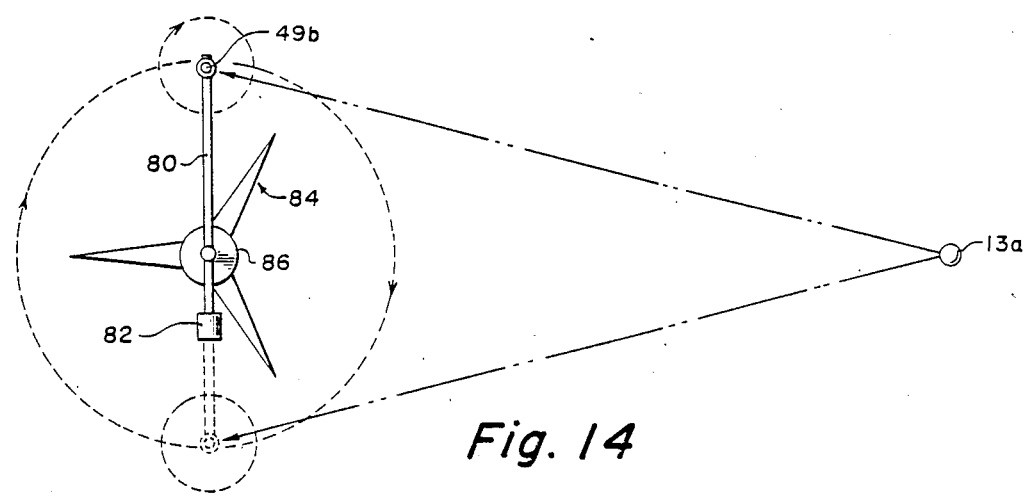

It will be appreciated that the embodiments discussed above may be designed for use in land surveying but are more suitable for use with data entry tablets. However, the embodiment of the invention shown in FIGS. 13 and 14 is especially suited for land surveying. A single photodetector 49b is mounted on the end of a boom 80 having a counterweight 82 at the other end thereof, the boom being mounted for rotation on a tripod 84 or other suitable support, and rotated at a known velocity by means of a motor 86. A light source 13a is provided at the point remote from the detector, the light from this source being detectable by the single detector at each of two positions, as illustrated in FIG. 14. In the illustrated embodimnt, the positions are shown at diametrically opposite positions of a rotary cycle. A narrow field of view for the detector is provided by an convenient means, such as a rotating slit as described above. Thus, a line of sight between the light source and each light sensing position of the detector is specified, and the position of the light source then determined. A smaller version of this single detector embodiment can also be employed for data table or other data entry purposes.

In all the embodiments discussed heretofore, it is assumed that there is a clear "line of sight" between the light source and the two light receiving locations. This would usually be the case with data entry tablets of the type described, where the selected area is always located on one side of the "base line" which extends between the two selected light receiving locations. However, in applications where the "selected area" to be monitored completely surrounds the base line extending between the two light receiving locations, or where there may not always be a clear "line of sight" between the light source and both of the light receiving locations (such as in land surveying where the line of sight might be blocked by a tree or other non-movable objects), complete surveillance of the selected area may not be possible.

Figure 15:
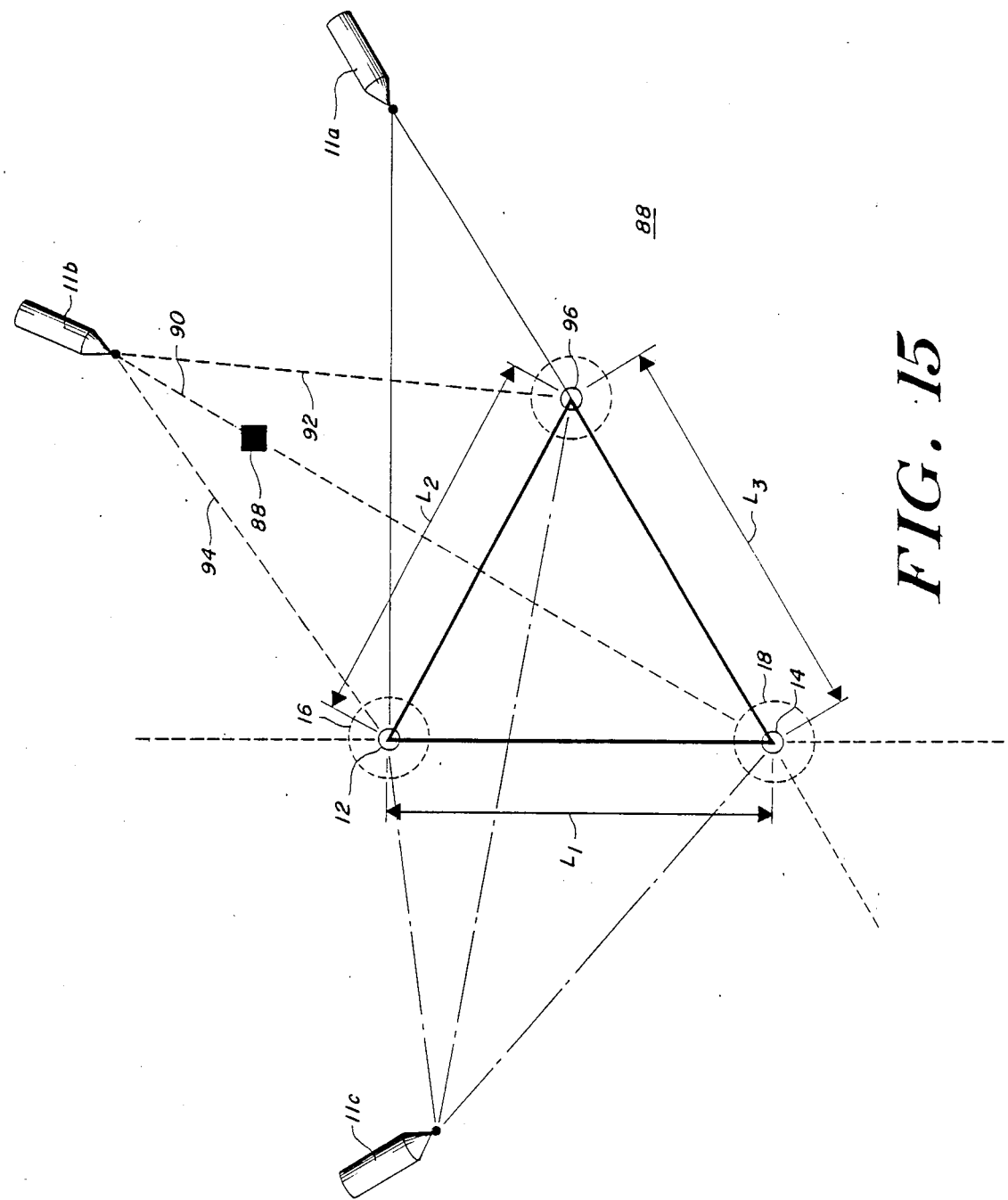
FIG. 15 is a diagrammatic representation of an embodiment of the invention employing three light receiving locations.

Therefore, according to another embodiment such as diagrammatically illustrated in FIG. 15, a third light receiving location may be provided to assure complete surveillance of the area. In the illustration of FIG. 15, those elements which are the same as elements shown in the embodiment of FIG. 2, carry common reference numbers. As shown, a first base line $L_1$ is defined by light receiving diodes 12 and 14 which scan selected area 88 extending on both sides of base line $L_1$ as indicated by light pen 11A and 11B on the right side and light pen 11C on the left side. Normally almost all locations in the select area 88 would satisfactorily be scanned by light receiving diodes 12 and 14 such that the position of a light source could readily be determined. However in the event an object 89 which is opaque to light source 11B was located so as to block the line of sight between light pen 11B and light receiving diode 14 (which line of sight is represented by line segments 90 and 92), the light receiving diodes 14 would not have an input to help determine the location of light pen 11B, and consequently the location of light pen 11B along the line of sight 94 could not be determined. However, according to the embodiment of the present invention show in in FIG. 15, there is also included a third light receiving diode 96 which is located at a known position and distance with respect to base line $L_1$. As is also clear from the illustration of FIG. 15, there are secondary base lines $L_2$ and $L_3$ established between the light receiving diodes 12 and 96, and 14 and 96 respectively. Consequently, the position of light pen 11B may readily be determined by processing the information from light receiving diode 12 and 96 with respect to base line $L_2$ in the same manner as the information from light receiving diode 12 and 14 was processed with respect to base line $L_1$. In a similar manner, if the line of sight between the light source and light receiving diode 12 is blocked, information from light receiving diode 14 and light receiving diode 96 may be used with respect to base line $L_3$ to determine the position of the light source. A third light receiving diode would also be necessary if the light source were to lie along an extension of a base line extending between two light receiving diodes even if there was no blockage of light paths. For example as shown in FIG. 15 light pen 11A lies along an extension of $L_3$ and consequently, it is impossible to determine the distance of the light source using light receiving diode 14 in combination with light receiving diode 12 or light receiving diode 96. However, in this example the location of light pen 11A may readily be determined by processing the information received from light receiving diode 12 and light receiving diode 96 with respect to base line $L_2$.

Light pen source 11C is included to illustrate that the surveillance area or selected area completely surround the light receiving locations. Furthermore, although the light receiving diode 12, 14 and 96 are arranged in FIG. 15 so as to form an equilateral triangle to simplify the processing of data or calculations, the three locations of the light receiving diodes could form a right triangle or any other irregular triangle so long as the location and distance of each light receiving diode is known with respect to every other light receiving diode.

This invention is not to be limited by what has been particularly shown and described except as indicated in the appended claims.

What is claimed is:

1. Apparatus for determining the position of at least one light source located and movable within a selected area comprising:
    light detecting means, for monitoring light means emitted by said at least one light source, at first and second locations, respectively, said first and second locations spaced a first predetermined distance apart along a base line;
    said light detecting means suitable for detecting said light means emitted by said at least one light source located within said selected area, and wherein said light detecting means operates independently of said at least one light source;
    means for determining a first line of detection between said at least one light source and a first light detecting means, said first line of detection occurring when said light means from said at least one light source is detected by said first light detecting means, and wherein said first line determining means operates independently of movement of said at least one light source;
    means for determining a second line of detection between said at least one light source and a second light detecting means, said second line of detection occurring when said light means from said at least one light source is detected by said second light detecting means, and wherein said second line determining means operates independently of movement of said at least one light source;
    means for ascertaining a first angle between said base line and said first line of detection, and for ascertaining a second angle between said base line and said second line of detection; and
    means responsive to said means for ascertaining for determining and providing signals representative of the position of said at least one light source within said selected area.

2. The apparatus of claim 1 wherein said first and second line determining means further includes means associated with each said light detecting means for providing at each of said first and second locations a moving field of view which includes a point of reference associated therewith, movement of said field of view being independent of said at least one light source, and wherein said angle-ascertaining means further includes means for ascertaining the position of the moving point of reference with respect to said first location when the point of reference intersects said first line, and means for ascertaining the position of the moving point of reference with respect to said second location when the point of reference intersects said second line.

3. The apparatus of claim 1 or 2 wherein said at least one light source further includes first and second light sources, said second light source spaced apart from said first light source a second predetermined distance, the pair of light sources indicative of a straight edge movable within said selected area; and wherein said light detecting means are adapted to detect light means emitted by said first and second light sources, and said first and second line determining means further includes means for determining a third line of detection between said second light source and said first light detecting means, said third line of detection occurring when said light means from said second light source is detected by said first light detecting means and wherein said third line determining means operates independently of movement of said second light source, and means for determining a fourth line of detection between said second light source and said second light detecting means, said fourth line of detection occurring when said light means from said second light source is detected by said second light detecting means, and wherein said fourth line determining means operates independently of movement of said second light source, said means for ascertaining further including means for ascertaining a third angle between said base line and said third line of detection, and for ascertaining a fourth angle between said base line and said fourth line of detection, and said means for determining and providing signals representative of the position of said second light source within said selected area and the position of said straight edge indicated by said pair of light sources within said selected area.

4. The apparatus of claim 2 wherein said first and second moving fields of view move arcuately around said first and second locations respectively.

5. The apparatus of claims 1, 2 or 4 wherein said light detecting means comprises a pair of photodetectors positioned one each at said first and second locations.

6. The apparatus of claims 1, 2 or 4 wherein said light detecting means for monitoring further comprises:
    means for supporting said light detecting means at a known distance from a pivot point; and
    means for pivoting said light detecting means around said pivot point such that said light detecting means intersects said first and second locations.

7. The apparatus of claim 2 wherein said light detecting means comprises a pair of photodetectors positioned one each at said first and second locations; and said means for providing a moving field of view comprises a pair of opaque members located one each between said selected area and said pair of photodetectors, each of said opaque members defining a slit for transmitting a narrow beam of light means from said at least one light source therethrough, and means for repetitively moving said opaque member and said slit defined therein along a known path to provide said moving field of view of said selected area.

8. The apparatus of claim 7 wherein said known path is a straight line adjacent each of said first and second locations.

9. The apparatus of claim 7 wherein said known path is a circular path around each of said first and second locations.

10. Apparatus for providing signals representative of one or more positions of at least one light source movable within a selected area, comprising:
   first and second photodetecting means spaced at first and second locations, respectively, along a base line by a first predetermined distance;
   means associated with each said photodetecting means for providing a moving field of view for each photodetecting means, said moving fields of view moving arcuately around said photodetecting means independently of movement of said at least one light source;
   means for monitoring angular positions of each of the arcuately moving fields of view with respect to the base line and providing signal indications thereof;
   light means emitted by said at least one light source detectable by each of the photodetecting means;
   a first signal generated by said first photodetecting means upon receipt of said light means from said at least one light source through the field of view of the first photodetecting means;
   a second signal generated by said second photodetecting means upon receipt of said light means from said at least one light source through the field of view of the second photodetecting means; and
   means operative in response to said signal indications of the angular position monitoring means when said first and second signals are generated by said first and second photodetecting means, respectively, for providing a signal representing the position of the at least one light source within the selected area.

11. The apparatus of claim 10 wherein said at least one light source further includes first and second light sources, said second light source spaced along a predetermined line from the first light source and emitting light means detectable by each of said photodetecting means, the first and second light sources defining a straight edge movable within the selected area, and wherein
   the first and second photodetecting means are further operative to provide signals representative of said light means from said second light source when received through said first and second fields of view, and wherein
   said means for providing a signal representing the position of said first light source is further operative in response to said signal indications of said angular position monitoring means when said light means from said second light source is respectively detected by said first and second photodetecting means for providing signals representing the position said second light source and the position of said straight edge within said selected area.

12. The apparatus of claim 4 or 10 wherein said arcuately moving fields of view are rotating fields of view.

13. The apparatus of claim 12 wherein said means for providing a rotating field of view is operative to provide said rotating field of view at a predetermind angular velocity.

14. The apparatus of claim 13 wherein the predetermined angular velocity is constant.

15. The apparatus of claims 1, 2, or 10 wherein said at least one light source is a light emitting diode.

16. The apparatus of claims 2 or 10 wherein said means for providing a moving field of view includes an opaque member moving between said selected area and each of said first and second locations, said opaque member having a slit therein to provide a narrow field of view.

17. The apparatus of claim 10 wherein said arcuately moving fields of view associated with each said first and second locations includes a first and second reference point, respectively.

18. The apparatus of claims 4 or 17 wherein said means for providing said arcuately moving fields of view associated with each of said first and second locations includes at least a portion of an opaque cylinder with an axial slit therein at least partially surrounding each said first and second locations, and wherein each said axial slit represents said first and second reference points, respectively.

19. The apparatus of claims 4 or 17 wherein each said arcuately moving fields of view is provided by opaque shield means having a distinct boundary at least partially surrounding said first and second locations, respectively, said shield means movable with respect to said first and second locations to interrupt said light means traveling from said at least one light source toward said first and second locations, and wherein said distinct boundary on each said opaque shield is said first and second reference point, respectively.

20. The apparatus of claim 11, wherein light means emitted by each of said first and second light sources is respectively coded, and wherein the photodetecting means is operative to distinguish between said first and second light sources.

21. The apparatus of claim 11 and further including:
   a template including said straight edge and having a plurality of information characters and symbols thereon;
   means for selecting one of said plurality; and
   means for providing a signal representative of said selected one of said plurality.

22. The apparatus of claims 1, 2, or 10 wherein said selected area is a data entry tablet and said at least one light source is a stylus having a light emitter on the tip thereon, and movable on the surface of the data entry tablet.

23. The apparatus of claim 10 wherein:
   said first and second photodetecting means further includes third photodetecting means for monitoring light means of said at least one light source at a third location spaced a second predetermined distance along a second base line from said first location, and wherein a third signal is generated by said third photodetecting means upon receipt of said light means from said at least one light source through the field of view associated with said third photodetecting means, and said means for providing a position signal further includes means operative in response to a signal indication of said angular positioning monitoring means associated with said third photodetecting means when said third signal is generated for providing a signal representing the position of the at least one light source within said area.

24. A data entry system for providing signals representative of one or more positions of a stylus movable within a defined area, comprising:
- first and second photodetecting means spaced along a base line and separated by a predetermined distance therebetween, and wherein said first and second photodetecting means are immobile with respect to said stylus;
- means associated with each photodetector for providing a uniformly rotating narrow field of view for each said first and second photodetecting means, and wherein rotation of said narrow field of view for said each said first and second photodetecting means is independent of movement of said stylus;
- means for monitoring an angular position of each of the narrow fields of view with respect to the base line and providing signal indications thereof;
- a light emitter associated with said movable stylus, said light emitter providing light means detectable by each of the first and second photodetecting means;
- a first signal generated by said first photodetecting means each time said first photodetecting means, said narrow field of view associated therewith and said light means are in linear alignment;
- a second signal generated by said second photodetecting means each time said second photodetecting means, said narrow field of view thereof, and said light means are in linear alignment; and
- means operative in response to the signal indications of the angular position monitoring means when said first and second signals are generated by said first and second photodetecting means, respectively, for providing a signal representing the position of the stylus within the defined area.

25. The apparatus of claims 1, 2, or 10 wherein said selected area is a land area to be surveyed, and said at least one light source is a reference pole selectively emitting light means of a predetermined characteristics, said reference pole being movable over said land area.

26. A method for determining a position of a light source movable within a selected area comprising the steps of:
- emitting light having selected characteristics from said light source located within said selected area;
- uniformly scanning said selected area from first and second locations spaced a predetermined distance apart along a base line, said step of uniformly scanning further comprising
  - positioning first and second photodetecting means at said first and second locations, respectively,
  - sequentially exposing incremental segments of each said first and second photodetecting means to said selecting area, said sequentially exposing occurring independently of movement of said light source, and
  - monitoring said exposed incremental segments of each said first and second photodetecting means with respect to a reference associated therewith;
- detecting emitted light from said light source at each said first and second locations, said detecting occurring independently of movement of said light source;
- correlating said monitored incremental detection segments of said first and second photodetecting means with said detected light at each said first and second locations, respectively, to determine a first line of sight between said detected light and said first location and a second line of sight between said detected light and said second location, respectively;
- determining a first angle between said base line and said first line of sight and a second angle between said base line and said second line of sight; and
- computing the position of said light source within said selected area from said first and second angles and said predetermined distance.

27. A data entry tablet for providing signals representative of one or more positions of a stylus movable within the area of the table, comprising:
- first and second photodectors spaced along a base line and separated by a predetermined distance therebetween, said first and second photodetectors being immovable with respect to said stylus;
- mean associated with each photodetector for providing a rotating narrow field for each photodetector, rotation of said narrow field of view of each photodetector being independent of movement of said stylus;
- means for monitoring angular positions of each of the narrow fields of view with respect to the base line and providing signal indications thereof;
- a light emitter associated with said movable stylus, said light emitter providing light means detectable by each said first and second photodetectors;
- a first signal generated by said first photodetector each time said first photodetector, said narrow field of view associated therewith and said light means are in linear alignment;
- a second signal generated by said second photodetector each time said second photodetector, said narrow field of view associated therewith and said light means are in linear alignment; and
- means operative in responsne to the signal indications of the angular position monitoring means when said first and second signals are generated by said first and second photodetectors, respectively, for providing a signal representing the position of the emitter within the area of the tablet.

28. The data entry tablet of claim 27 including:
- a light emitter spaced along a predetermined line from the light emitter of the stylus providing a light means detectable by each said first and second photodectors, the pair of light emitters defining a straight edge movable within the area of the tablet;
- the first and second photodetectors being operative to detect said light means from each of the emitters and provide said first and second signals representative thereof, respectively; and
- said means for providing said signal representing the position of the emitter being operative in response to the signal indications of the angular position of each of the rotating means when said first and second signals are generated to provide a signal representing the position of each said emitter and the straight edge within the area of the tablet.

29. The data entry tablet of claim 27 wherein the means associated with each said first and second photodetectors is operative to provide a rotating field of view at a predetermined angular velocity.

30. The data entry tablet of claim 29 wherein the predetermined angular velocity is constant.

31. The data entry system tablet of claim 27 wherein the stylus includes the light emitter on a tip of the stylus movable on the surface area of the tablet.

32. The data entry tablet of claim 31 wherein the light emitter is a light emitting diode.

33. The data entry tablet of claim 27 wherein said means operative to provide a narrow field of view includes for each photodetector:
    an opaque housing having a slit therein to provide the narrow field of view for said light means receivable by said first and second photodetectors from the light emitter.

34. The data entry tablet of claim 33 wherein the opaque housing is a cylinder having an axial slit therein.

35. The data entry tablet of claim 28 wherein each of the light emitters are respectively coded, and wherein the first and second photodetectors are operative to provide respective first and second coded signals for distinguishing between respective light means.

36. The data entry tablet of claim 28 further including:
    a template including said straight edge and having information characters thereon; and
    means for reading the information characters.

37. A data entry system for providing signals representative of one or more positions of a stylus movable within a defined area, comprising:
    first and second photodetectors spaced along a base line and separated by a predetermined distance therebetween, said first and second photodetectors being immovable with respect to said stylus;
    means associated with each photodetector for providing a rotating narrow field of view for each photodetector, rotation of said narrow field of view of each photodetector being independent of movement of said stylus;
    means for monitoring an angular position of each of the narrow fields of view with respect to the base line and providing signal indications thereof;
    a light emitter associated with said movable stylus, said light emitter providing light means detectable by each of the first and second photodetectors;
    a first signal generated by said first photodetector each time the first photodetector, said narrow field of view associated therewith and said light means are in linear alignment;
    a second signal generated by said second photodetector each time the second photodetector, said narrow field of view associated therewith and said light means are in linear alignment; and
    means operative in response to the signal indications of the angular position monitoring means when said first and second signals are generated for providing a signal representing the position of the emitter within the defined area.

* * * * *

UNITED STATES PATENT AND TRADEMARK OFFICE
CERTIFICATE OF CORRECTION

PATENT NO. : 4,688,933 (Page 1 of 3)
DATED : August 25, 1987
INVENTOR(S) : James M. Lapeyre It is certified that error appears in the above-identified patent and that said Letters Patent is hereby corrected as shown below:

IN THE ABSTRACT line 17-18    "light detach-    should read --light detect-able--
                              able"

Column 1, line 8,    "particulary" should read --particularly--
          line 13,   "knwon" should read --known--

Column 2, lines 44-45,  "roatat-ing" should read --rotating--
          line 63,   "soruce" should read --source--

Column 3, line 16,  "prefered" should read --preferred--

Column 4, line 64,  "point of edge" should read --point or edge--

Column 5, line 41,  "alighnment" should read --alignment--
          line 51,   "64 which" should read --64 with--

Column 6, line 14,  "embodimnt," should read --embodiment,--
          line 22,   "data table" should read --data tablet--
          line 57,   "diodes 14" should read --diode 14--
          line 62,   "show in in" should read --shown in--

Column 7, line 2,  "diode 12 and 96" should read --diodes 12 and 96--
          line 4,    "diode 12 and 14" should read --diodes 12 and 14--
          line 26,   "diode 12, 14 and 96" should read --diodes 12, 14 and 96--

UNITED STATES PATENT AND TRADEMARK OFFICE
CERTIFICATE OF CORRECTION

PATENT NO. : 4,688,933

DATED : August 25, 1987

INVENTOR(S) : James M. Lapeyre

It is certified that error appears in the above-identified patent and that said Letters Patent is hereby corrected as shown below:

Column 8, line 48, "means for determining" should read --means responsive to said means for ascertaining further including means for determining-- line 55, "locations respectively." should read --locations, respectively.--

Column 9, line 68 and Column 10, line 1, "the posi-  should read tion said" --the posi- tion of said-- line 3, "claim 4 or 10" should read --claims 4 or 10-- line 7, "predetermind" should read --predetermined-- line 41, "claim 11, wherein" should read --claim 11 wherein--

Column 11, line 48, "of a predetermined" should read --of predetermined--

Column 12, line 21, "table," should read --tablet,-- line 22, "photodectors" should read --photodetectors--

UNITED STATES PATENT AND TRADEMARK OFFICE
CERTIFICATE OF CORRECTION

PATENT NO. : 4,688,933 (Page 3 of 3)

DATED : August 25, 1987

INVENTOR(S) : James M. Lapeyre

It is certified that error appears in the above-identified patent and that said Letters Patent is hereby corrected as shown below:

Column 12, line 46, "responsne" should read --response-- line 56, "photodectors" should read --photodetectors--

Signed and Sealed this

Fourteenth Day of February, 1989

*Attest:*

DONALD J. QUIGG

*Attesting Officer*     *Commissioner of Patents and Trademarks*